United States Patent
Nakao

(10) Patent No.: US 11,014,319 B2
(45) Date of Patent: May 25, 2021

(54) METHOD OF FORMING BEAD APEX RUBBER AND FORMING DEVICE

(71) Applicant: NAKATA ENGINEERING CO., LTD., Kobe (JP)

(72) Inventor: Naoyasu Nakao, Kobe (JP)

(73) Assignee: NAKATA ENGINEERING CO., LTD., Kobe (JP)

( * ) Notice: Subject to any disclaimer, the term of this patent is extended or adjusted under 35 U.S.C. 154(b) by 220 days.

(21) Appl. No.: 16/345,484

(22) PCT Filed: Oct. 13, 2017

(86) PCT No.: PCT/JP2017/037218
§ 371 (c)(1),
(2) Date: Apr. 26, 2019

(87) PCT Pub. No.: WO2018/079313
PCT Pub. Date: May 3, 2018

(65) Prior Publication Data
US 2019/0248086 A1    Aug. 15, 2019

(30) Foreign Application Priority Data
Oct. 28, 2016    (JP) .............................. JP2016-211977

(51) Int. Cl.
*B29D 30/48*    (2006.01)

(52) U.S. Cl.
CPC ........ *B29D 30/48* (2013.01); *B29D 2030/481* (2013.01); *B29D 2030/482* (2013.01)

(58) Field of Classification Search
CPC .............. B29D 2030/482; B29D 30/48; B29C 2045/0006; B29C 2030/481
(Continued)

(56) References Cited

U.S. PATENT DOCUMENTS

| 2009/0266474 A1 | 10/2009 | Matsuyama et al. |
| 2014/0252673 A1 | 9/2014 | Tsubotani et al. |
| 2015/0068668 A1 | 3/2015 | Onimatsu et al. |

FOREIGN PATENT DOCUMENTS

| EP | 2851186 A1 | 3/2015 |
| JP | 7-205333 A | 8/1995 |

(Continued)

OTHER PUBLICATIONS

International Search Report for PCT/JP2017/037216 (PCT/ISA/210) dated Nov. 7, 2017, with English translation.
(Continued)

*Primary Examiner* — Katelyn B Whatley
*Assistant Examiner* — Alexander D Booth
(74) *Attorney, Agent, or Firm* — Birch, Stewart, Kolasch & Birch, LLP

(57) ABSTRACT

To solve problems of complication and malfunction of the device's structure, an increase in the process time, and malfunction caused by catching of a front end portion of a bead apex rubber.
A bead apex rubber forming method comprises a forming step P1, a connecting space opening step P2, a connecting space closing step P3, and a connecting step P4. In a rear closed state R of a molding chamber 11, the forming step P1 injects unvulcanized rubber G while a bead core A is being rotated, and forms a bead apex rubber B having a front end portion Bf. when the front end portion Bf approaches a rear shutter part 9, the connecting space opening step P2 removes a second lateral surface S2 together with the rear shutter part 9, and forms, between the front end portion Bf and a rear end portion Br, a connecting space J whose second side surface S2 side is opened. The connecting space closing step P3 closes the connecting space 3 by disposing a third lateral surface S3 extending between the rear end portion Br and the front end portion Bf. The connecting step P4 injects the
(Continued)

unvulcanized rubber into the connecting space J closed, and connects between the rear end portion Br and the front end portion Bf integrally.

8 Claims, 10 Drawing Sheets

(58) Field of Classification Search
    USPC .................................................. 156/398, 136
    See application file for complete search history.

(56) References Cited

FOREIGN PATENT DOCUMENTS

| JP | 2011-173369 A | 9/2011 |
|----|---------------|--------|
| JP | 2011-235525 A | 11/2011 |
| JP | 2013-237224 A | 11/2013 |
| WO | WO 2008/010293 A1 | 1/2008 |
| WO | WO 2013/065102 A1 | 5/2013 |
| WO | WO 2013/172127 A1 | 11/2013 |

OTHER PUBLICATIONS

Written Opinion of the International Searching Authority for PCT/JP2017/037218 (PCT/ISA/237) dated Nov. 7, 2017.
Extended European Search Report, dated Apr. 24, 2020, for European Application No. 17865641.9.

[Fig. 1]
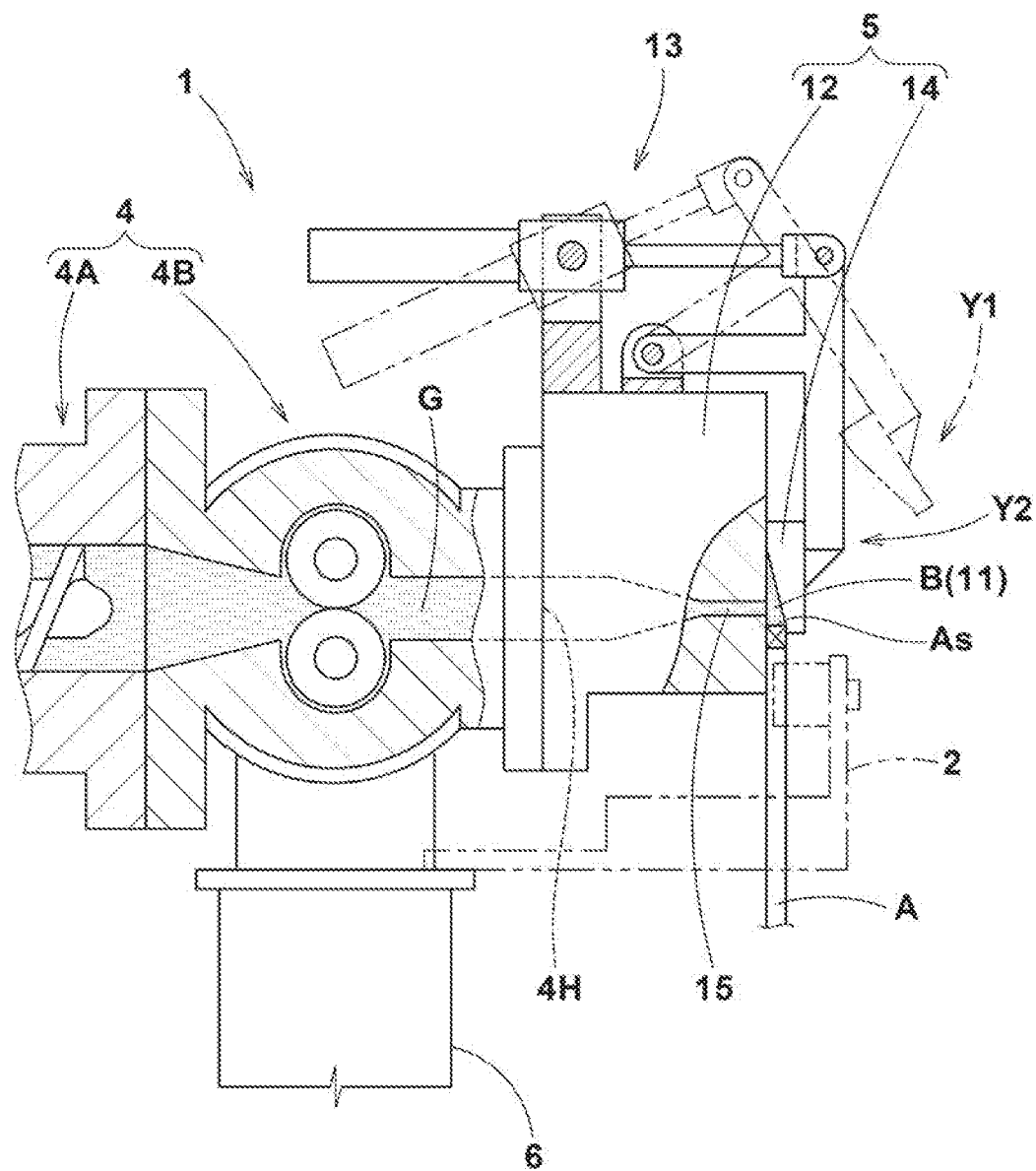

[Fig. 2]
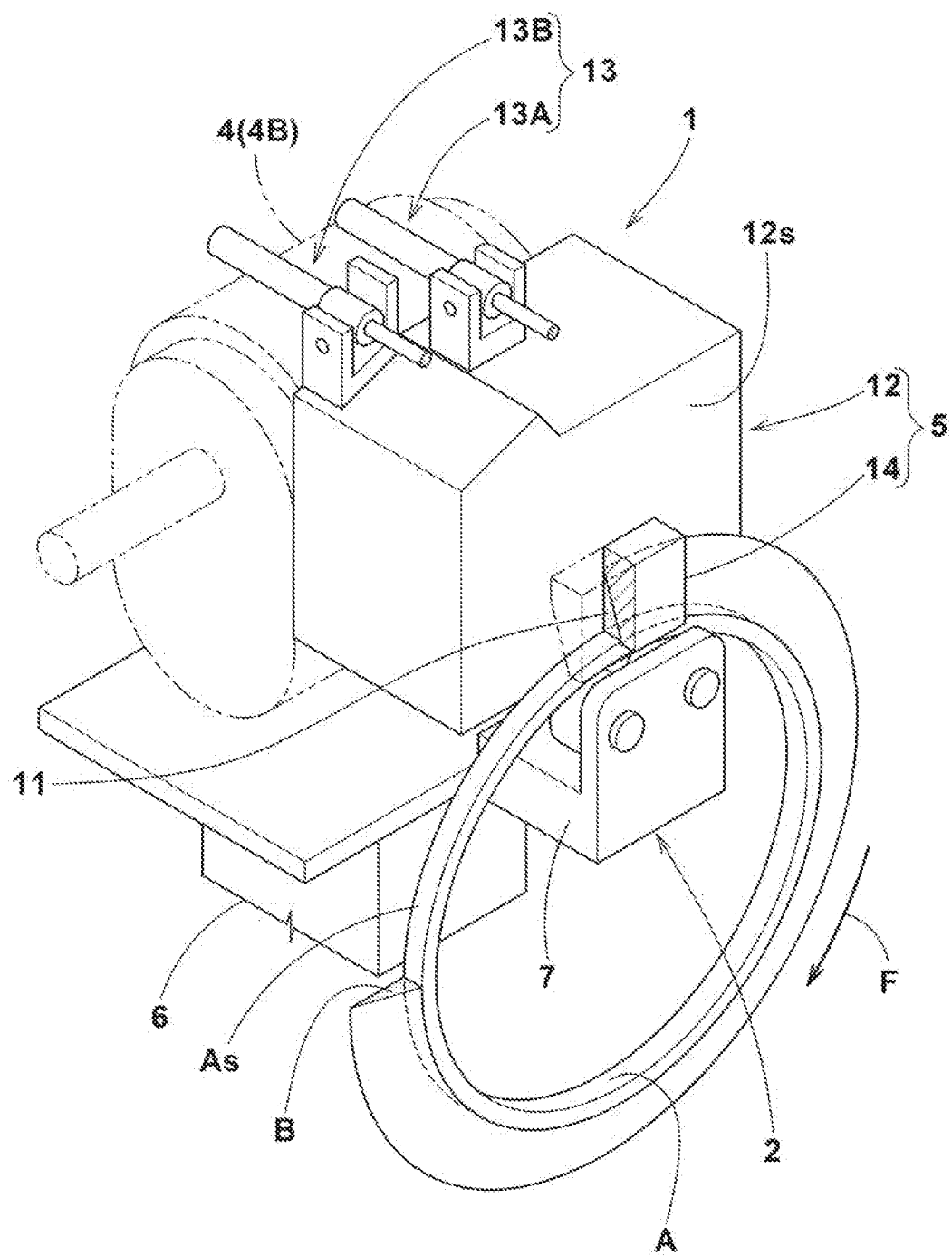

[Fig. 3]
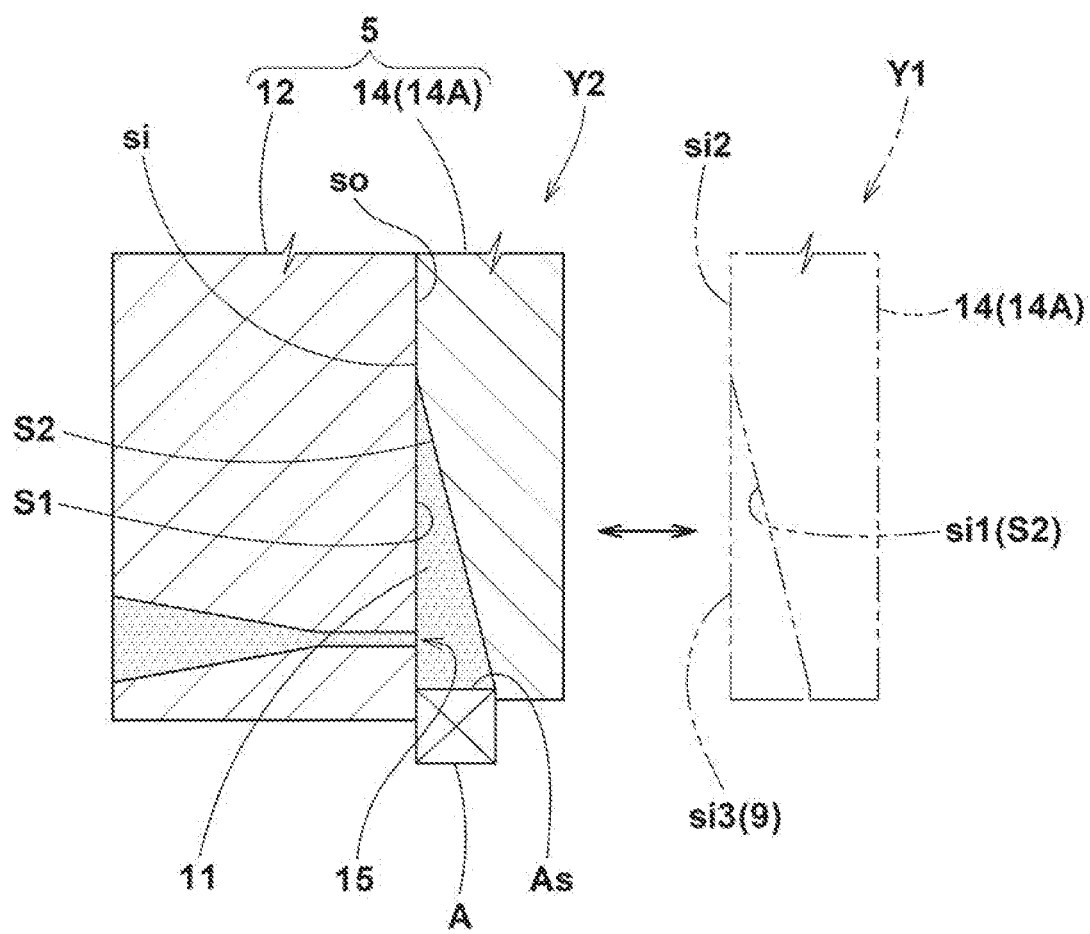

[Fig. 4]
(A)
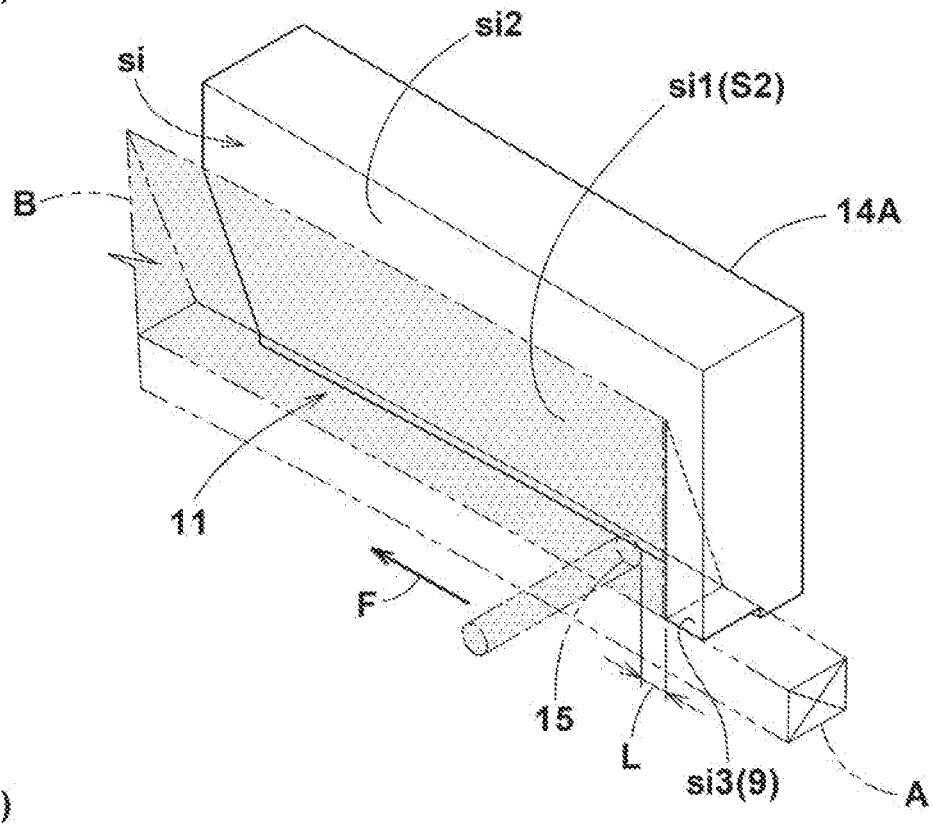
(B)
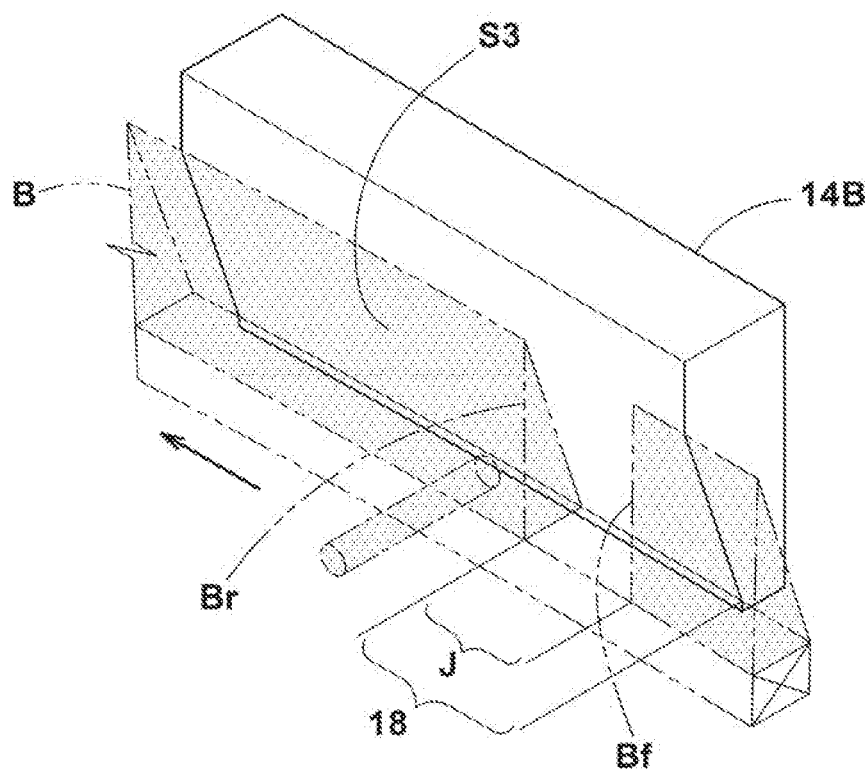

[Fig. 5]
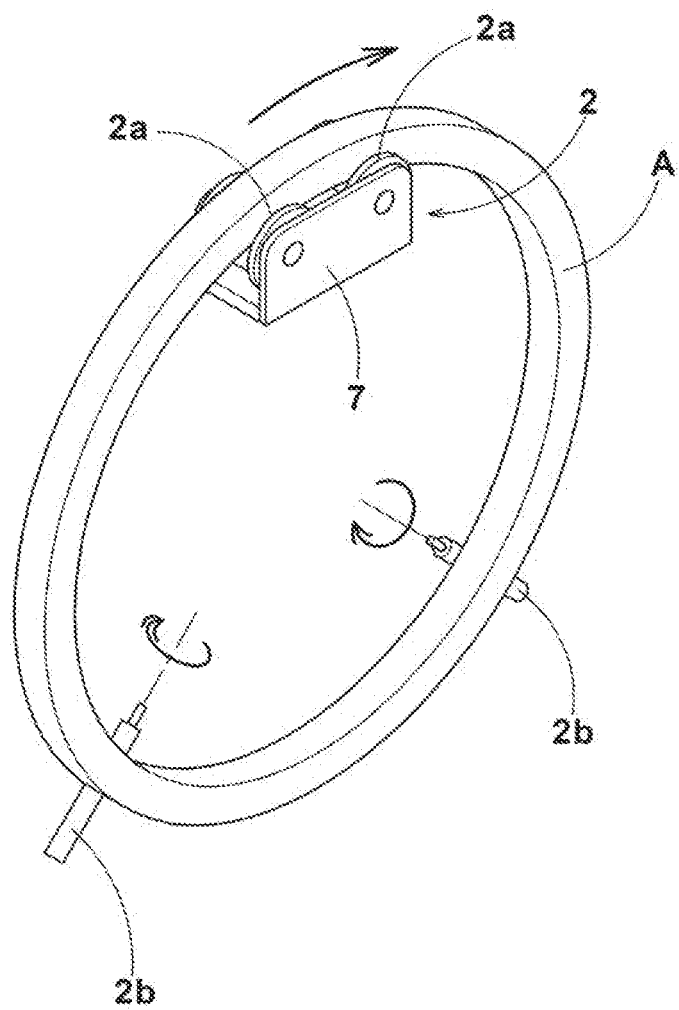

[Fig. 6]
(A)
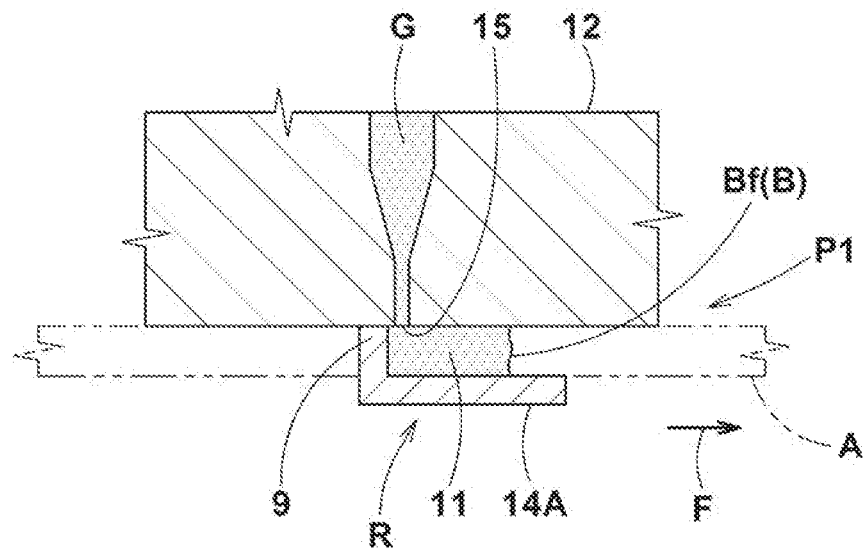
(B)
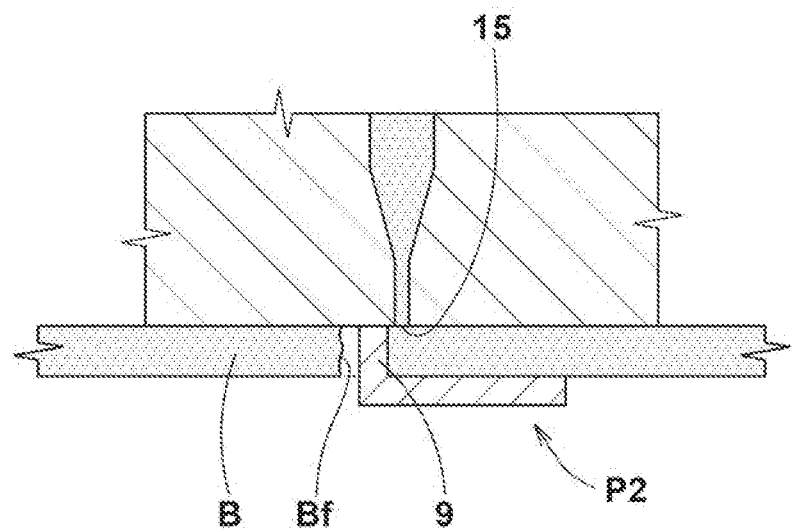

[Fig. 7]
(A)
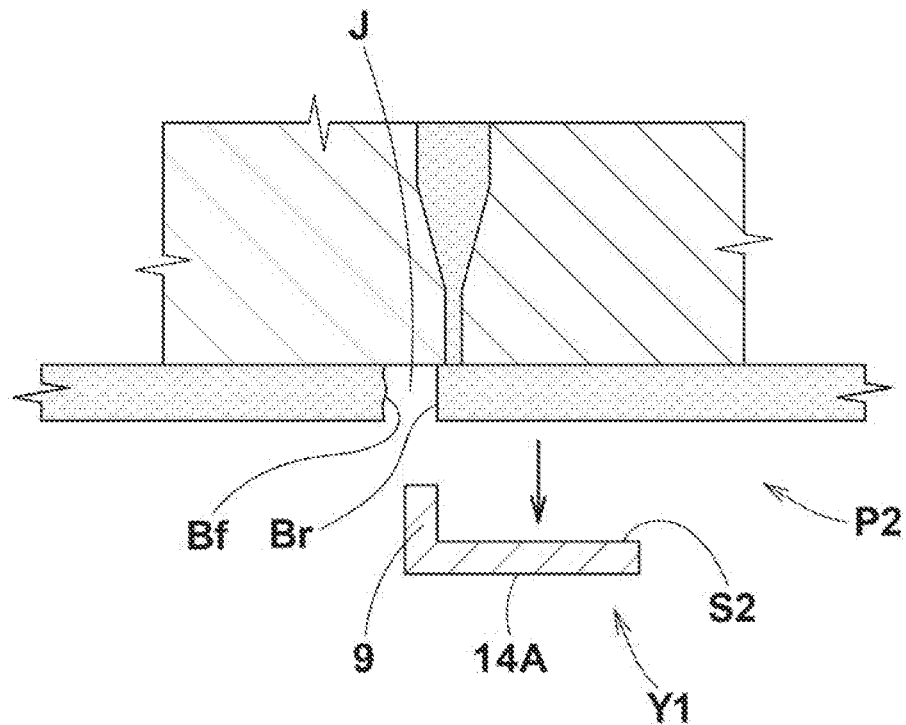
(B)
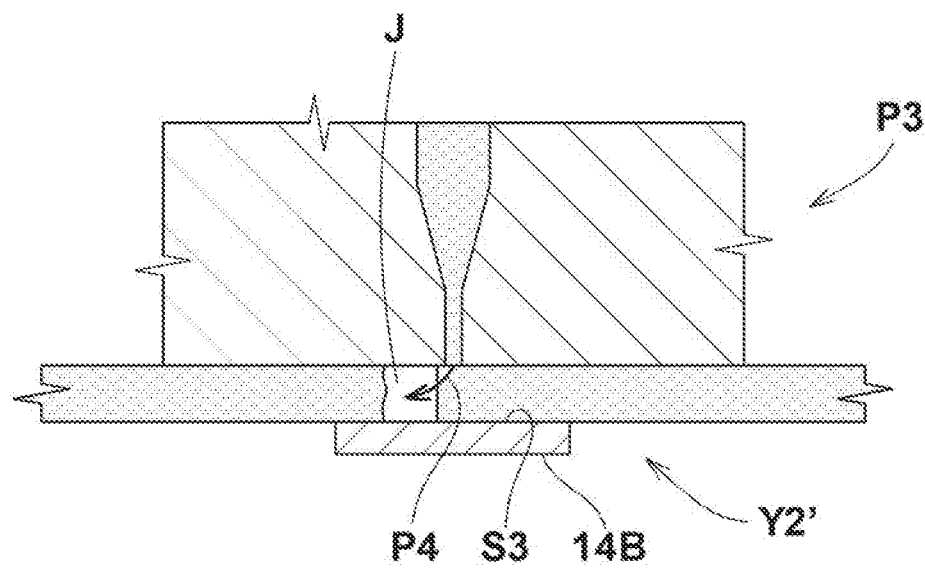

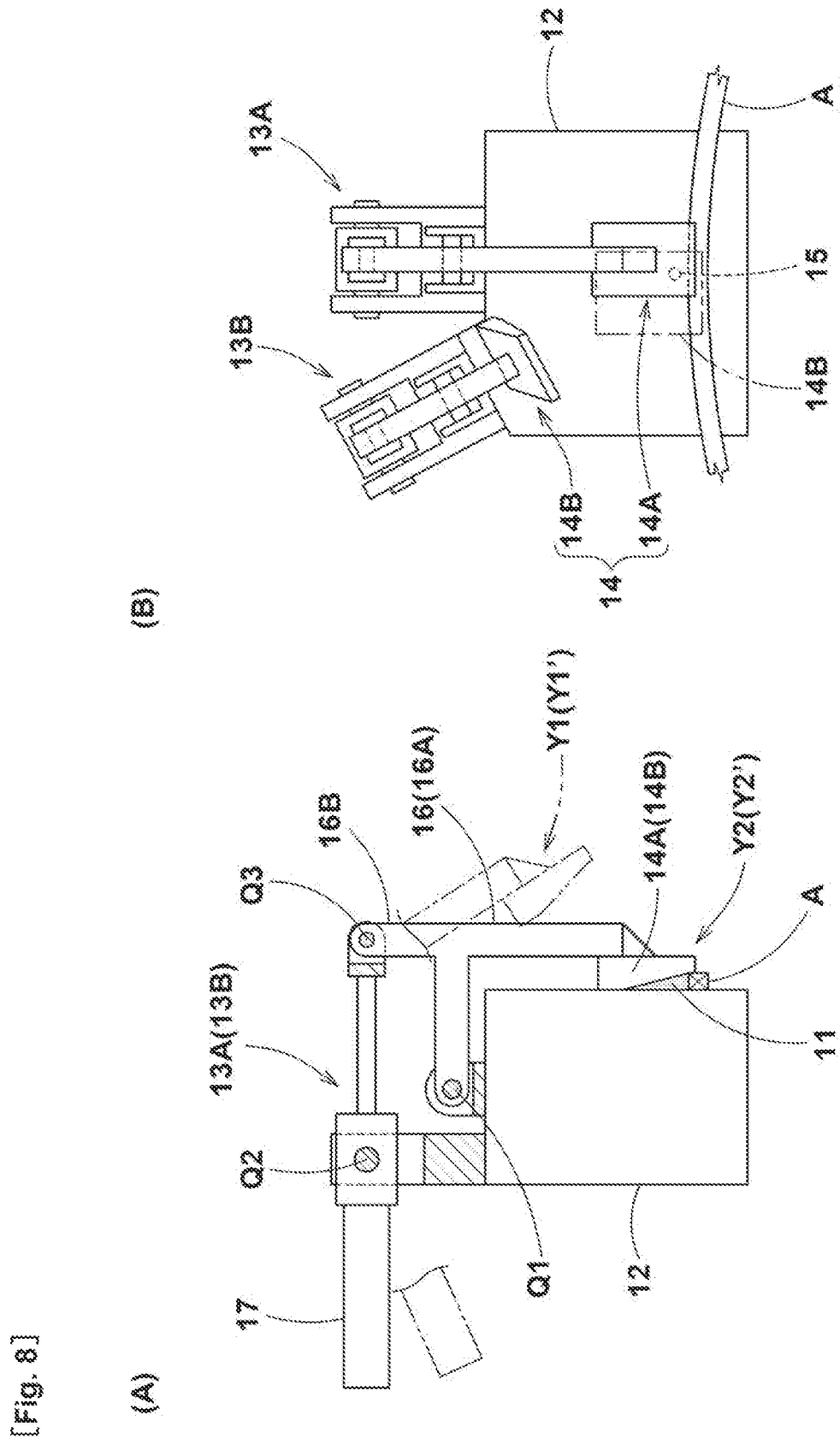
[Fig. 8]

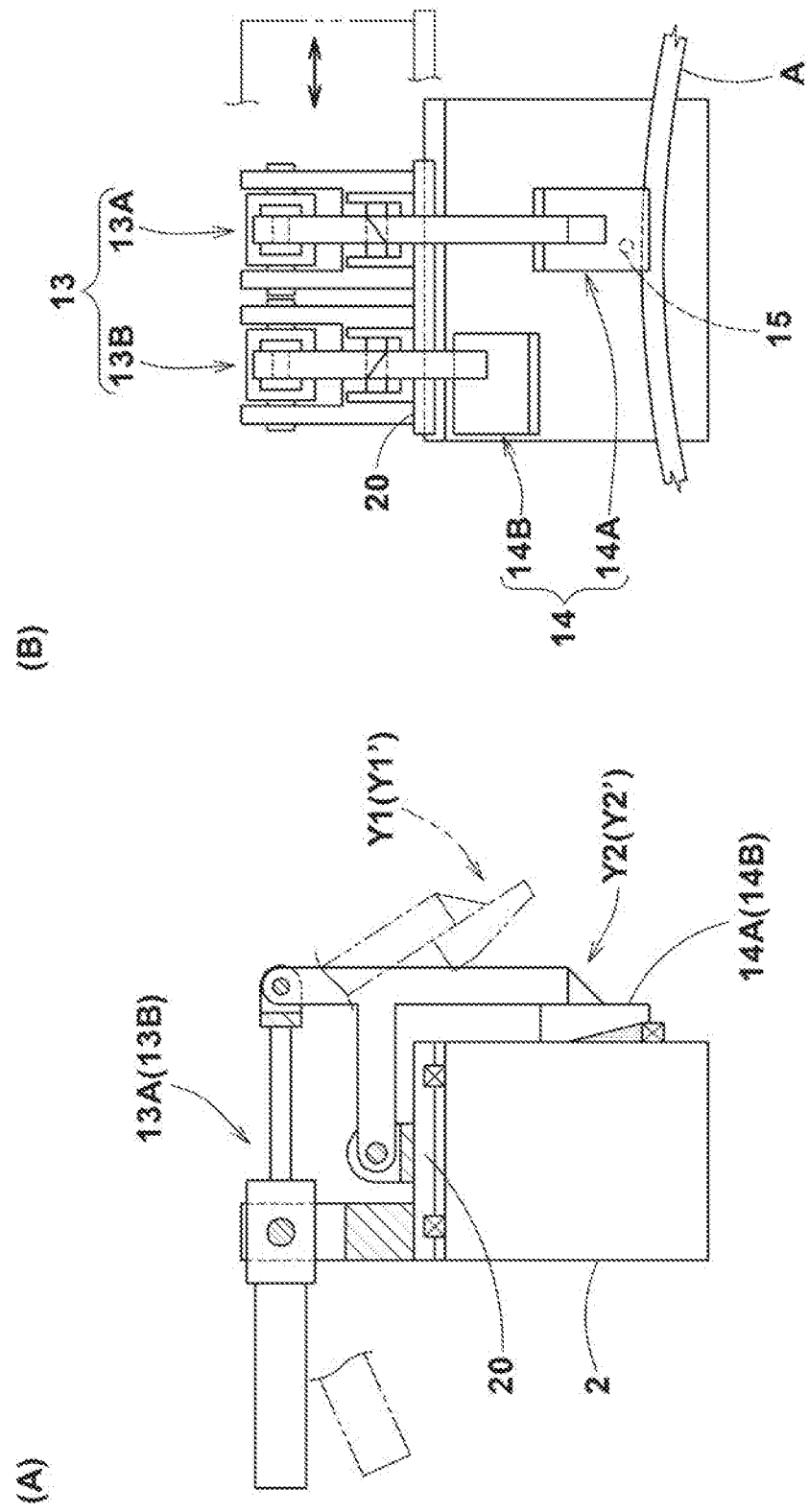

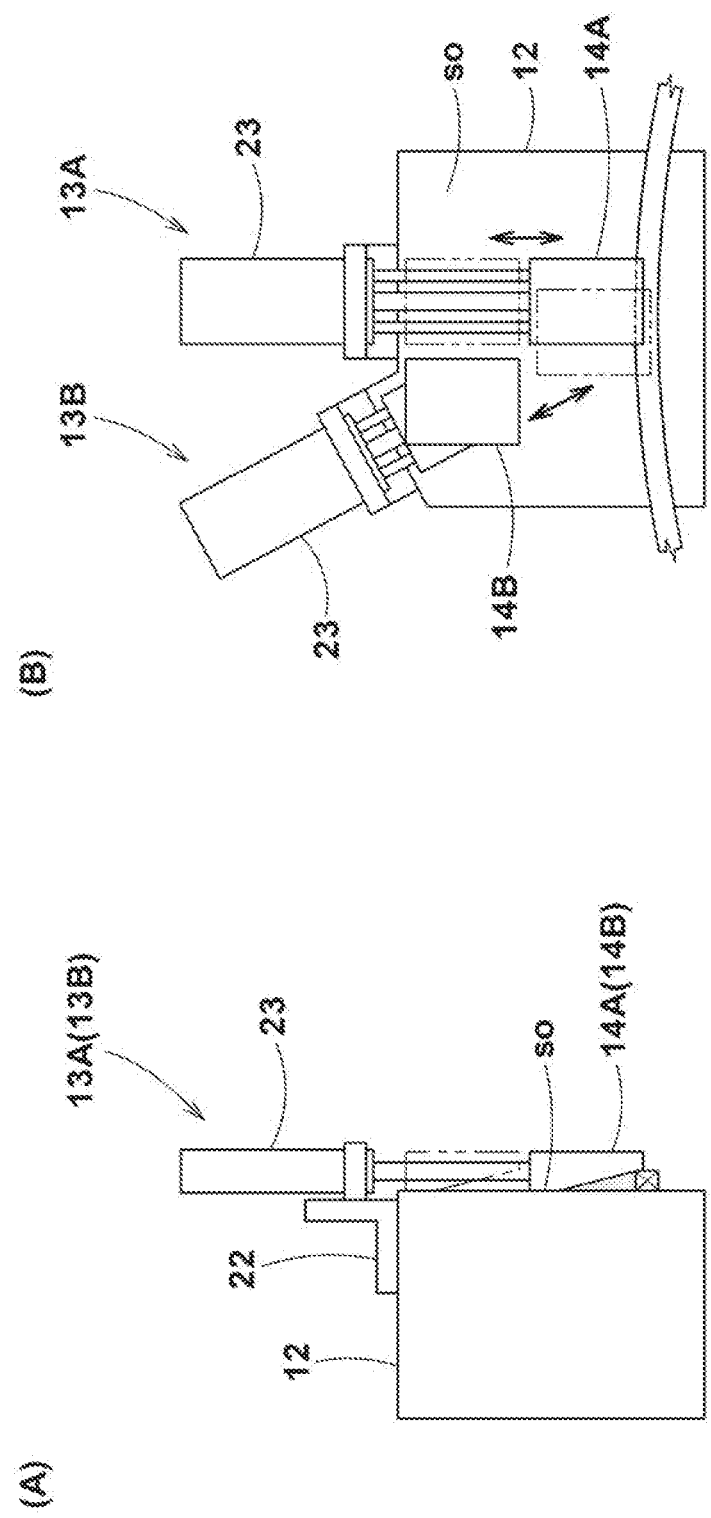
[Fig. 10]

METHOD OF FORMING BEAD APEX RUBBER AND FORMING DEVICE

TECHNICAL FIELD

The present invention relates to a method of forming a bead apex rubber and a forming device capable of accurately forming a bead apex rubber on an outer circumferential surface of a bead core.

BACKGROUND ART

In the following patent document 1, there is proposed a method of forming a bead apex rubber comprising a forming step of forming a bead apex rubber integrally on an outer circumferential surface of a bead core. In this forming step, unvulcanized rubber is injected into a shaping chamber. The shaping chamber is formed by the outer circumferential surface of the rotatably supported bead core and inner wall surfaces of a shaping head enclosing both axial sides of the outer circumferential surface. Further, the forming step includes a front end portion forming step, an intermediate portion forming step, and a connecting step.

In the front end portion forming step, a shaping space whose front and rear sides are respectively closed by shutters, is formed in the shaping chamber. unvulcanized rubber is filled in the shaping space in a state in which a rotation of the bead core is stopped. As a result, a front end portion of the bead apex rubber is formed between the front and rear shutters.

In the intermediate portion forming step, the front shutter is removed, and the unvulcanized rubber is injected while rotating the bead core. Thereby, the intermediate portion of the bead apex rubber is formed continuously from the front end portion.

In the connecting step, when the bead core makes substantially one revolution and the front end portion returns to a rear space of the shaping chamber, the bead core is stopped. The rear space is provided in a rear side of the shaping space by being separated by the rear shutter. By removing the rear shutter, a connecting space is formed between the front end portion and a rear end portion of the bead apex rubber.

In the above forming step, however, the front and rear shutters exist, and it is necessary to operate the respective shutters independently. This leads the device to a complicated structure. Further, malfunctions are liable to be caused.

Further, in the front end portion forming step, it is necessary to fill the entire shaping space with the unvulcanized rubber in the state where the rotation of the bead core is stopped. This leads to an increase in the process time. Further, degradation of the shape of the front end portion is liable to occur due to overflow of the excessively filled rubber.

Further, in the connecting step, when the front end portion returns to the inside of the rear space, the front end portion is easily caught by a cover plate which forms one of the inner wall surfaces of the shaping chamber. In that case, it becomes impossible to return, which causes malfunction.

PRIOR ART DOCUMENT

Patent Document
Patent Document 1: Japanese Patent Application Publication No. 2013-237224

SUMMARY OF THE INVENTION

Problems to be Solved by the Invention

It is therefore, an object of the present invention to provide a method of forming a bead apex rubber and a forming device which can solve the problems of the complication and malfunction of the device's structure due to the front and rear shutters, the increase in the process time caused by the front end portion forming step, and the malfunction caused in the connecting step by the catching of the front end portion of the bead apex rubber.

Means for Solving the Problem

A first invention of the present application is a method of forming a bead apex rubber in which the bead apex rubber is formed on an outer circumferential surface of the bead core continuously over its one circumference, and comprising a forming process of forming, on the outer circumferential surface of the bead core, a shaping chamber which is enclosed by a first lateral surface on one side and a second lateral surface on the other side in an axial direction of a shaping head, and which extends in the circumferential direction, and forming the bead apex rubber integrally on the outer circumferential surface of the bead core rotating around its axis, by injecting unvulcanized rubber into the shaping chamber through a rubber inflow port provided in the first lateral surface, wherein the forming process is characterized by comprising a forming step of forming the bead apex rubber having an front end portion by injecting the unvulcanized rubber while rotating the bead core in a rear-closed state of the shaping chamber of which front side in the rotating direction is opened, and of which rear side is closed by a rear shutter part provided at the rear end portion of the second lateral surface, a connecting space opening step in which a connecting space of which second lateral surface Side is opened is formed between the front end portion and a rear end portion of the bead apex rubber by stopping the bead core and removing the second lateral surface together with the rear shutter part when the bead core has been rotated substantially one revolution and the front end portion approaches the rear shutter part, a connecting space closing step of closing the connecting space by disposing a third lateral surface extending over at least the rear end portion and the front end portion in stead of the second lateral surface, and a connecting step of connecting the rear end portion and the front end portion integrally by injecting the unvulcanized rubber into the connecting space closed.

A second invention of the present application is a bead apex rubber forming device for forming a bead apex rubber on an outer circumferential surface of a bead core continuously over its one circumference, and comprising a bead core holding means for holding the bead core rotatably about its axis, and a shaping head attached to a rubber extruder and forming, on the bead core, a shaping chamber enclosed by a first lateral surface on one side and a second lateral surface on the other side in the axial direction and extending in the circumferential direction, and characterized in that the shaping head comprises a head main body having the first lateral surface, and provided in the first lateral surface with a rubber inflow port, and a covering wall body including a first covering wall body and a second covering wall body, the first covering wall body has the second lateral surface, and a rear shutter part disposed at a rear end portion of the second lateral surface, and being for closing a rear side of the shaping chamber, the first covering wall body is supported movably between a closed state in which the second lateral surface Side and the rear side of the shaping chamber are closed, and an open state in which the second lateral surface Side and the rear side of the shaping chamber are opened, and the second covering wall body does not have a rear shutter part, and has a third lateral surface for closing only the second lateral surface, instead of the first covering wall body, when the first covering wall body is in the open state.

Effect of the Invention

In the method of forming the bead apex rubber of the present invention, in a state in which the front side of the shaping chamber is opened and only the rear side is closed, the unvulcanized rubber is injected thereinto while rotating the bead core. As a result, a main body of the bead apex rubber having the front end portion is formed. That is, the front end portion forming step of the Patent Document 1 is eliminated, and through an intermediate portion forming step, the front end portion is formed together.

Therefore, it is possible to shorten the process time by eliminating the time required for the front end portion forming step. Incidentally, when the bead apex rubber is formed in a state where the front side of the shaping chamber is opened, the front end face of the front end portion becomes uneven due to the absence of the front shutter. However, since the rubber is filled between the front end face and the rear end portion by the connecting step, the uneven is disappeared after the connection. Rather, since the rubber is prevented from protruding in the front end portion forming step, the forming precision of the bead apex rubber can be enhanced.

when the bead core has made substantially one revolution and the front end portion of the bead apex rubber approaches the rear shutter part, the second lateral surface is removed together with the rear shutter part. Further, instead of the second lateral surface, the third lateral surface is disposed so as to extend between the rear end portion and the front end portion.

Accordingly, it is possible to prevent malfunction such as catching of the front end portion of the bead apex rubber at the time of returning. Also, it is possible to reliably close the connecting space with the third lateral surface. Therefore, the connection by the rubber between the rear end portion and the front end portion can be performed with high accuracy.

In addition, it is not necessary to have the front and rear shutter portions and to control their motions independently. Therefore, it is possible to simplify the device's structure and to suppress malfunction.

In the present invention, although the rear shutter part is provided, the rear shutter part is disposed at the rear end portion of the second lateral surface and moved together with the second lateral surface. Therefore, it does not hinder the simplification of the device's structure and the suppression of malfunction.

The same applies to the bead apex rubber forming device of the present invention, wherein the shaping head comprises the covering wall body composed of the first covering wall body provided with the rear shutter part at the rear end portion of the second lateral surface, and the second covering wall body not provided with the rear shutter part.

when the first covering wall body is in the open state, the second covering wall body closes only the second lateral surface instead of the first covering wall body.

Therefore, similarly to the above-described forming method, it is possible to prevent the complication and malfunction of the device's structure due to the front and rear shutters, the increase in the process time by the front end portion forming step, and the malfunction in the connecting step due to the catching of the front end portion of the bead apex rubber and or the like.

BRIEF DESCRIPTION OF THE DRAWINGS

FIG. 1 A partial side view where an essential part of a bead apex rubber forming device of the present invention is enlarged.

FIG. 2 A perspective view of the essential part of the bead apex rubber forming device.

FIG. 3 A sectional view in an axial direction showing a shaping chamber.

FIG. 4 (A), (B) are perspective views of the first and second covering wall bodies viewed from a head main body side.

FIG. 5 A perspective view conceptually showing the bead core holding means.

FIG. 6 (A), (B) are cross sectional views for explaining the forming step as seen from above.

FIG. 7 (A) is a cross-sectional view for explaining the connecting space opening step as seen from above, (B) is a cross-sectional view for explaining the connecting space closing step as seen from above.

FIG. 8 (A), (B) are a side view and a front view showing an example of the holding means for a covering wall body.

FIG. 9 (A), (B) are a side view and a front view showing another example of the holding means for the covering wall body.

FIG. 10 (A), (B) are a side view and a front view showing still another example of the holding means for the covering wall body.

MODE FOR CARRYING OUT THE INVENTION

Hereinafter, embodiments of the present invention will be described in detail.

As shown in FIGS. 1 and 2, the forming device 1 for a bead apex rubber B of the present embodiment has a bead core holding means 2 for holding a bead core A for use in a tire so as to be rotatable about its axis, and a shaping head 5 attached to a front end portion of a rubber extruder 4. And, the forming device 1 forms the bead apex rubber B on the outer circumferential surface of the bead core A continuously over one circumference thereof.

The rubber extruder 4 is not particularly limited, and that having a well-known structure may be suitably employed. In this example, the rubber extruder 4 has an extruder main body 4A of a screw-type and a gear pump 4B connected to the tip end thereof. The rubber extruder 4 can extrude unvulcanized rubber G from a rubber discharge port 4H according to on/off of the gear pump 4B.

As shown in FIG. 5, in this example, the bead core holding means 2 has a pair of holding rollers 2a, 2a which are parallel to each other and receive the inner circumferential surface of the bead core A. The holding rollers 2a, 2a are rotatably supported by a support base 6 (shown in FIGS. 1 and 2) which for example, supports a front end portion of the rubber extruder 4, through a roller holder 7. The bead core A is held rotatably around a horizontal axis in a state bridging between the holding rollers 2a, 2a and hanged therefrom.

The bead core holding means 2 of the present example is provided with a plurality of side rollers 2b stabilizing the attitude of the bead core A by receiving the side surface of the bead core A.

As shown in FIGS. 2 and 3, a circumferential part of the rotating bead core A is able to pass through the shaping head 5. The shaping head 5 forms a shaping chamber 11, which has a triangular cross section, on the outer circumferential surface As of the passing bead core A.

The shaping chamber 11 is enclosed by the outer circumferential surface As and a first lateral surface S1 on one side and a second lateral surface S2 on the other side in the axial direction of the shaping head 5, and extends in the circumferential direction.

specifically, the shaping head 5 comprises a head main body 12 fixed to the front end portion of the rubber extruder 4, and a covering wall body 14 supported by the head main body 12 through a holding means 13.

The head main body 12 forms the above-mentioned first lateral surface S1 by its outward-directed surface So.

The first lateral surface S1 is provided with a rubber inflow port 15 allowing the unvulcanized rubber G coming from the rubber extruder 4 to flow into the shaping chamber 11.

As shown in FIGS. 8 (A), (B), the covering wall body 14 is formed from a first covering wall body 14A and a second covering wall body 14B.

The first covering wall body 14A has, as shown in FIGS. 3 and 4 (A), the second lateral surface S2 for forming the shaping chamber 11, and a rear shutter part 9 for closing a rear side (rear side in the rotation direction F) of the shaping chamber 11. The rear shutter part 9 is disposed at the rear end portion (rear end portion of the rotation direction F) of the second lateral surface S2. It is preferable that the rear shutter portion 9 is disposed closely to the rubber inflow port 15. In particular, it is preferable that the distance L (shown in FIG. 4 (A)) in the circumferential direction between the rear shutter portion 9 and the rubber inflow port 15 is not more than 1 mm.

The shaping head 5 does not have a front shutter, and the front side (front side in the rotation direction F) of the shaping chamber 11 is opened.

In the present example, the first covering wall body 14A has a block shape.

The inward-directed surface Si of the first covering wall body 14A has an inclined surface portion si1, an upper abutting surface portion si2 and a side abutting surface portion si3. The inclined surface portion si1 is inclined downward. The upper abutting surface portion si2 is continuous with the upper edge of the inclined surface portion si1, and capable of coming into contact with the outward-directed surface So. The side abutting surface portion si3 is continuous with the rear edge of the inclined surface portion si1, and has the side abutting surface portion si3 which is capable of coming into contact with the outward-directed surface So.

The inclined surface portion si1 forms the second lateral surface S2.

The upper abutting surface portion sit closes the upper side of the shaping chamber 11, and it functions as a stopper for the first covering wall body 14A in the closed state Y2.

The side abutting surface portion si3 forms the rear shutter part 9.

As shown in FIG. 8 (A), (B), the first covering wall body 14A is supported by a first holding means 13A to be movable between the closed state Y2 and the open state Y1. In the closed state Y2, the second lateral surface S2 side and the rear side of the shaping chamber 11 are closed.

In the open state Y1, the second lateral surface S2 side and the rear side of the shaping chamber 11 are opened.

In the open state Y1, the core assembly is taken out from the shaping chamber 11, and the next bead core A is mounted in the shaping chamber 11.

In the present example, the first holding means 13A has an arm 16 whose one end is fixed to the first covering wall body 14A, and a driving tool 17.

The arm 16 is not particularly limited, but in this example, it has an L-shaped main portion 16A whose one end is fixed to the first covering wall body 14A, and the other end is pivotally supported by a fulcrum Q1 provided on the head main body 12. The driving tool 17 tilts the arm 16 up and down about the fulcrum Q1. The driving tool 17 in this example is a cylinder and is pivotally supported by the head main body 12 so as to be able to tilt up and down about a fulcrum Q2.

The end of the rod of the driving tool 17 is pivotally supported at a position Q3 different from the fulcrum Q1 through, for example, a sub portion 16B extending from the main portion 16A. Thus, by expansion and contraction of the rod, the first covering wall body 14A can be moved between the open state Y1 and the closed state Y2.

The second covering wall body 14B does not have the rear shutter part 9 as shown in FIG. 4 (B).

when the first covering wall body 14A is in the open state Y1, instead of the first covering wall body 14A, the second cover member 14B closes only the second lateral surface Side of the shaping chamber 11.

The second covering wall body 14B has the almost same configuration as the first covering wall body 14A, but differs in the following points.

a) The second covering wall body 14B does not have the rear shutter part 9.

b) The second covering wall body 14B has a third lateral surface S3 that closes the second lateral surface Side of the shaping chamber 11, instead of the second lateral surface S2.

c) The third lateral surface S3 has an extended surface portion 18 longer than the second lateral surface S2.

In a closed state Y2' in which the second covering wall body closes the second lateral surface Side, the extended surface portion 18 extends toward the rear side (rear side in the rotation direction F) beyond the rear end position of the rear shutter part 9 in the closed state Y2 of the first covering wall body.

Since the third lateral surface S3 has the extended surface portion 18 as described above, it is possible, in the undermentioned connecting space closing step P3, to extend between the rear end portion Br and the front end portion Bf of the bead apex rubber B so as to close the connecting space J.

As shown in FIG. 8 (A), (B), the second covering wall body 14B is also supported movably between the open state Y1' and the closed state Y2' by a second holding means 13B. when the first covering wall body 14A is in the closed state Y2, the second covering wall body 14B stands by in the open state Y1'.

when the first covering wall body 14A is in the open state Y1, the second covering wall body 14B becomes in the closed state Y2', and closes only the second lateral surface Side of the shaping chamber 11 instead of the first covering wall body 14A. That is, the connecting space 7 is closed.

The second holding means 13B has the same configuration as the first holding means 13A, and is capable of opening and closing the second lateral surface Side of the shaping chamber 11, alternately, by tilting in a different direction.

FIG. 9 (A), (B) shows another example of the shaping head 5. This example is provided on the head main body 12 with a moving base 20 movable in the circumferential direction. on the moving base 20, the first and second holding means 13A, 138 are mounted side by side in the circumferential direction. Although the first and second holding means 13A and 13B are the same in the tilting direction, they can open and close the second lateral surface Side of the shaping chamber 11, alternately, by being moved in the circumferential direction with the movable base 20.

FIG. 10 (A), (B) shows another example of the first and second holding means 13A, 13B. In this example, each of the first and second holding means 13A, 13B does not have the arm 16 pivotally supported so as to tilt. The first and second covering wall bodies 14A, 14B are supported slidably along the outward-directed surface So of the head main body 12. specifically, each of the first and second holding means 13A, 13B has a cylinder 23 for example fixed to the head main body 12 through a mounting metal fitting 22 for example, and the first and second covering walls 14A, 14B are attached to the lower ends of the rods of the respective cylinders 23, so as to be slidable along the outward-directed surface So. As the cylinder 23 in this example, a cylinder with a guide is used. However, guides (not shown) for guiding the first and second covering wall bodies 14A, 14B can be provided in the head main body 12 as appropriate.

Next, a method of forming a bead apex rubber will be described with reference to the forming device 1.

The forming method of the present embodiment comprises a forming process. In the forming process, as shown in FIG. 2, the unvulcanized rubber G is injected into the shaping chamber 11, and thereby, the bead apex rubber B is integrally formed on the outer circumferential surface As of the bead core A being rotating.

This forming process comprises a forming step P1, a connecting space opening step P2, a connecting space closing step P3, and a connecting step P4.

FIGS. 6 and 7 are sectional views of the shaping chamber 11 as seen from above, wherein the bead core A is omitted or indicated by a one-dot chain line for the sake of convenience. As shown in FIG. 6, the forming step P1 is performed in a rear-closed state R (the closed state Y2). The rear-closed state R is a state in which the second lateral surface Side and the rear side of the shaping chamber 11 are closed by the first covering wall body 14A. The front side of the shaping chamber 11 is opened.

Then, in the rear-closed state R, the unvulcanized rubber G is injected from the rubber inflow port 15 while rotating the bead core A. As a result, the main body of the bead apex rubber B having the front end portion Bf is continuously formed.

In the forming step P1 in this example, the bead core A is caused to rotate together with the formed rubber portion by the pushing force of the unvulcanized rubber G filling the shaping chamber 11 in the rear-closed state R. Therefore, in the forming device 1 in this example, it is not necessary to drive the bead core A by a motor or the like, so it is possible to simplify the structure of the bead core holding means 2. Incidentally, it is also possible to perform the rotation and stop of the bead core A by using a driving means (not shown) such as a motor provided in the bead core holding means 2.

Next, in the connecting space opening step P2, as shown in FIG. 6 (B), when the bead core A has made substantially one revolution and the above-mentioned front end portion Bf approaches the rear shutter portion 9, the rotation of the bead core A is stopped. This stoppage can be performed by stopping the injection of the unvulcanized rubber G from the rubber inflow port 15, but it is also possible to supplementally use a brake means. It can also be performed by stopping the driving by the driving means.

Then, as shown in FIG. 7 (A), the first covering wall body 14A is made in the open state Y1, and the second lateral surface S2 is removed together with the rear shutter portion 9. As a result, between the rear end portion Br and front end portion Bf of the bead apex rubber B, there is formed a connecting space 3 of which second lateral surface S2 side is opened.

Next, the connecting space closing step P3 renders the second covering wall body 14B in the closed state Y2, instead of the first covering wall body 14A, as shown in FIG. 7 (B). Accordingly, the third lateral surface S3 of the second covering wall body 14B which extends at least between the rear end portion Br and the front end portion Bf is disposed, instead of the second lateral surface S2 of the first covering wall body 14A, and the connecting space 3 is closed.

Next, in the connecting step P4, as shown in FIG. 7 (B), the unvulcanized rubber G is injected into the connecting space 3 closed by the second covering wall body 14B, through the rubber inflow port 15. Thereby, the rear end portion Br and the front end portion Bf are integrally connected by the injected rubber. At this time, since the rubber inflow port 15 is close to the rear shutter portion 9, the unvulcanized rubber G coming from the rubber inflow port 15 can easily flow into the connecting space J.

while detailed description has been made of especially preferable embodiments of the present invention, the present invention can be embodied in various forms without being limited to the illustrated embodiments.

DESCRIPTION OF THE SIGNS 1 bead apex rubber forming device
2 bead core holding means
4 rubber extruder
5 shaping head
9 rear shutter portion
11 shaping chamber
12 head main body
13 holding means
14 covering wall body
14A first covering wall body
14B second covering wall body
15 rubber inflow port
As outer circumferential surface
A bead core
Bf front end portion
Br rear end portion
B bead apex rubber
G unvulcanized rubber
J connecting space
P1 forming step
P2 space opening step
P3 space closing step P4 connecting step
R rear-closed state
S1 first lateral surface
S2 second lateral surface
S3 third lateral surface
Y1, Y1' open state
Y2, Y2' closed state

The invention claimed is:

1. A method of forming a bead apex rubber in which the bead apex rubber is formed on an outer circumferential surface of a bead core continuously over its one circumference, the method of forming a bead apex rubber comprising
a forming process of
forming, on the outer circumferential surface of the bead core, a shaping chamber which is enclosed by a first lateral surface on one side and a second lateral surface on the other side in an axial direction of a shaping head, and which extends in the circumferential direction, and
forming the bead apex rubber integrally on the outer circumferential surface of the bead core rotating around its axis, by injecting unvulcanized rubber into the shaping chamber through a rubber inflow port provided in the first lateral surface,
wherein
the forming process is characterized by comprising
a forming step of forming the bead apex rubber having an front end portion by injecting the unvulcanized rubber while rotating the bead core in a rear-closed state of the shaping chamber of which a front side in the rotating direction is opened, and of which a rear side is closed by a rear shutter part provided at a rear end portion of the second lateral surface,
a connecting space opening step in which a connecting space of which second lateral surface side is opened is formed between the front end portion and a rear end portion of the bead apex rubber by stopping the bead core and removing the second lateral surface together with the rear shutter part when the bead core has been rotated substantially one revolution and the front end portion approaches the rear shutter part,
a connecting space closing step of closing the connecting space by disposing a third lateral surface extending over at least the rear end portion and the front end portion in stead of the second lateral surface, and
a connecting step of connecting the rear end portion and the front end portion integrally by injecting the unvulcanized rubber into the connecting space closed.

2. A bead apex rubber forming device for forming a bead apex rubber on an outer circumferential surface of a bead core continuously over its one circumference,
the bead apex rubber forming device comprising
a bead core holding means for holding the bead core rotatably about its axis, and
a shaping head attached to a rubber extruder and forming, on the bead core, a shaping chamber enclosed by a first lateral surface on one side and a second lateral surface on the other side in the axial direction and extending in the circumferential direction, and
characterized in that
the shaping head comprises a head main body having the first lateral surface, and provided in the first lateral surface with a rubber inflow port, and a covering wall body including a first covering wall body and a second covering wall body, the first covering wall body has the second lateral surface, and a rear shutter part disposed at a rear end portion of the second lateral surface and being for closing a rear side of the shaping chamber,
the first covering wall body is supported movably between a closed state in which the second lateral surface Side and the rear side of the shaping chamber are closed, and
an open state in which the second lateral surface Side and the rear side of the shaping chamber are opened, and
the second covering wall body does not have a rear shutter part, and has a third lateral surface for closing only the second lateral surface, instead of the first covering wall body, when the first covering wall body is in the open state.

3. The bead apex rubber forming device as set forth in claim 2, wherein
the third lateral surface has an extended surface portion longer than the second lateral surface, and
in a closed state in which the second covering wall body closes the second lateral surface side, the extended surface portion extends toward the rear side beyond a rear end position of the rear shutter part in the closed state of the first covering wall body.

4. The bead apex rubber forming device as set forth in claim 2, wherein
the first covering wall body is supported by a first holding means so as to be movable between the closed state and the open state, and
the second covering wall body is supported by a second holding means so as to be movable between a closed state and an open state.

5. The bead apex rubber forming device as set forth in claim 4, wherein
the first holding means has an arm whose one end holds the first covering wall body, and a driving tool for tilting the arm up and down about a fulcrum provided on the head main body, and
the second holding means has an arm whose one end holds the second covering wall body, and a driving tool for tilting the arm up and down about a fulcrum provided on the head main body.

6. The bead apex rubber forming device as set forth in claim 5, wherein
the tilting direction of the arm of the first holding means is different from the tilting direction of the arm of the second holding means.

7. The bead apex rubber forming device as set forth in claim 4, wherein
the head main body has a moving base movable in the circumferential direction, and
the first and second holding means are mounted on the moving base side by side in the circumferential direction.

8. The bead apex rubber forming device as set forth in claim 4, wherein
the head main body has an outward-directed surface being flush with the first lateral surface, and
the first and second covering wall bodies are supported by the first and second holding means so as to be slidable on the outward-directed surface.

* * * * *